(Model.)

R. A. BERGER.
ROLLER BEARING.

No. 543,719.  Patented July 30, 1895.

WITNESSES:
Gustave Dietrich
C. P. Elwell

INVENTOR
Richard A. Berger
BY Albert H. Norris
ATTORNEY.

UNITED STATES PATENT OFFICE.

RICHARD A. BERGER, OF BROOKLYN, NEW YORK.

ROLLER-BEARING.

SPECIFICATION forming part of Letters Patent No. 543,719, dated July 30, 1895.

Application filed April 16, 1895. Serial No. 545,888. (Model.)

*To all whom it may concern:*

Be it known that I, RICHARD A. BERGER, a citizen of the United States, residing at Brooklyn, in the county of Kings and State of New York, have invented new and useful Improvements in Roller-Bearings, of which the following is a specification.

This invention relates to ball or roller bearings particularly designed for the fifth-wheels of vehicles, turn-tables, and the like, but susceptible of being employed wherever a ball or roller bearing is desired to reduce friction between relatively-movable parts.

The chief object of my invention is to provide a new and improved ball or roller bearing which can be economically manufactured by simplified machinery and be readily fitted to the parts with which it is to co-operate.

The invention also has for its object to provide a novel construction whereby a ball or roller bearing can be made in the form of a chain of any required length and the extremities united to produce an endless band or chain of greater or less extent which can be applied or fitted to a circle of any diameter, according to the length of chain which is formed into the endless band.

The invention also has for its object to improve that type of ball or roller bearings wherein balls or rollers are arranged between circular plates or rings, whereby the expense, time, and trouble incident to laying off circles of varying diameter and arranging the ball or roller seats at proper intervals is avoided and a superior ball or roller bearing of this general character is obtained.

To accomplish all these objects, the invention consists, essentially, in a ball or roller bearing composed of a plurality of flexibly-connected links, each link having an orifice between its boundary edges through which projects the periphery of a rotatable bearing, so that portions of the periphery of said bearing lie above and below the upper and lower surfaces of the link, said links at all times retaining their flexible connection relatively to one another.

The invention also consists of certain other features of construction and combination or arrangement of parts, hereinafter described and claimed, reference being made to the accompanying drawings, in which—

Figure 1:
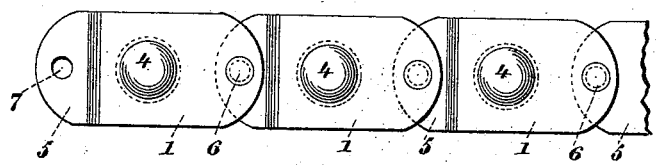
Figure 2:
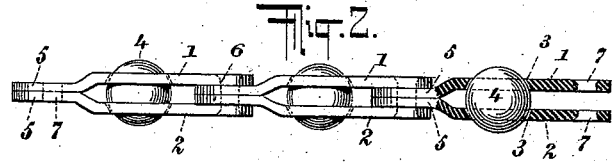
Figure 3:
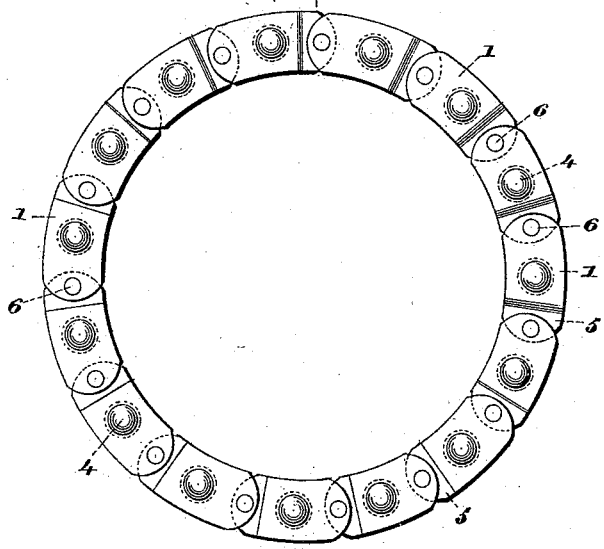
Figure 4:
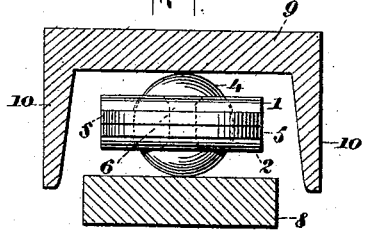

Figure 1 is a plan view of a portion of a band or chain from which my improved ball or roller bearing is constructed. Fig. 2 is a sectional side elevation of the same. Fig. 3 is a plan view of the ball or roller bearing; and Fig. 4 is a sectional view showing the ball or roller bearing located between two objects, one of which is movable relatively to the other—as, for example, the parts of the fifth-wheel of a vehicle or a turn-table.

In order to enable those skilled in the art to make and use my invention, I will now describe the same in detail. Referring to the drawing, wherein it will be observed that my improved ball or roller bearing comprises a plurality of flexibly-connected links, each link comprising two metallic plates 1 and 2, having coincident circular orifices 3, the edges of which constitute a seat for a roller 4. The roller is preferably in the form of a ball or exact sphere, but any other configuration suitable for the purpose in hand can be employed without altering the spirit of my invention. The two metallic plates 1 and 2 of each link, are separated from each other and are parallel the greater part of their length, and at one end portion, as at 5, the extremities are bent toward each other and lie contiguous, so that one end portion of each link can project between the separated metallic plates of another link. The ends of the links are connected by rivets 6, inserted through rivet-holes, as at 7, punched through the end portions of the plates composing the links. The ends 5 of the link-plates are flat and parallel, and the rivet or other connections are such that one link can be more or less moved relatively to another, thereby enabling a plurality of connected links to be shaped into a circular or approximately circular form, to produce a flexible ball-bearing chain.

The upper and lower plates composing each chain-link have their orifices coincident with one another and formed in the plates between the boundary edges thereof, so that when the rotatable bearing 4 is interposed between the plates the periphery of the rotatable bearing projects through the said orifices and constitutes bearing-surfaces to rest against a fixed and a movable object, or against two movable objects. Since the two plates of each chain-link are connected at their ends, and the rotatable bearings, composed of the rollers 4, are interposed between the plates and project through the orifices 3, the edges of the orifices retain the rotatable bearings in proper operative connection with the links of the chain.

The ball-bearing support 8 may be the lower ring or section of the fifth-wheel of a vehicle, and the rotatable ring or section 9 rests on and is sustained by the balls or rollers 4. The ring or section 9 is provided with pendent flanges 10, of such length as to extend below the upper surface of the support 8.

In the practical use of my improved ball-bearing, if the rotatable bearings 4 are in the form of spheres they will wear channeled or grooved paths in the support 8 and ring or section 9; but I wish it to be understood that I do not confine myself to making the rotatable bearings 4 in the form of spheres, as they may be of any other form suitable for the purpose without affecting the spirit of my invention.

In the manufacture of my improved ball-bearing the link-plates can be rapidly produced by dies or cutters, and any number of link-plates may be connected to produce a chain of indefinite length, and this chain can be subsequently divided into sections to form endless bands or chains suitable for circular parts of any diameter.

My invention enables endless bands or chains of any length to be made, and thus I avoid the expense, time, and trouble incident to mathematically laying off circular plates or rings of varying diameter and arranging ball or roller seats in such circular plates or rings, as heretofore practiced in producing that class of ball-bearings which comprise upper and lower rings and interposed balls which project through holes in the rings.

In my invention a ball or roller bearing of any diameter can be readily produced from a chain constructed as described and as shown in Figs. 1 and 2.

The provision of a ball or roller bearing composed of a series of connected links provided with balls or rollers renders it possible to conveniently and economically adapt the ball or roller bearing to circular parts from the smallest to the greatest diameter—as, for example, the fifth-wheel of a vehicle or the turn-table of a railway system.

Having thus described my invention, what I claim is—

1. A roller-bearing, consisting of a plurality of flexibly connected links, each link having an orifice between its boundary edges through which projects the periphery of a rotatable bearing, so that portions of the periphery of said bearing lie above and below the upper and lower sides of the link, and edge portions of said orifice retain said rotatable bearing in operative connection with the link, said links at all times retaining their flexible connection relatively to one another, substantially as described.

2. A roller-bearing, consisting of a plurality of flexibly connected links, each link comprising two plates formed with coincident orifices between their boundary edges through which projects the periphery of a rotatable bearing interposed between said plates, said links at all times retaining their flexible connection relatively to one another, substantially as described.

3. A roller-bearing, consisting of a plurality of flexibly connected links, each link formed of two plates having coincident orifices between their boundary edges through which projects the periphery of a rotatable bearing interposed between said plates, and the plates of each link bent toward each other at one end and inserted between and connected with the separated plates of another link, said links at all times retaining their flexible connection relatively to one another, substantially as described.

In testimony whereof I have hereunto set my hand in presence of two subscribing witnesses.

RICHARD A. BERGER.

Witnesses:
ALBERT H. NORRIS,
C. P. ELWELL.